Patented Aug. 28, 1945

2,383,789

UNITED STATES PATENT OFFICE 2,383,789

MILLABLE COMPOSITION

Mortimer T. Harvey, East Orange, N. J., assignor to Harvel Research Corporation, a corporation of New Jersey No Drawing. Application March 11, 1941,
Serial No. 382,740

7 Claims. (Cl. 260—27)

The present invention relates to compositions of matter in which artificial rubber of the "Buna" or polymerized butadiene type and vinyl polymers are in compatible mixtures or solutions, and the present invention relates to methods and steps for preparing and using the compositions of the present invention.

The essential ingredients of the compositions of the present invention, (1) artificial rubbers of the "Buna" type and (2) a vinyl polymer are brought together by (3) a mutual solvent or mutually compatible vehicle for the "Buna" and the vinyl polymer, illustrative examples of such mutual solvents or vehicle being tricresyl phosphate; products of condensation of formaldehyde with a tertiary alcohol or an unsaturated hydrocarbon or oxy-hydrocarbon; and alkyl esters of abietic acid, alkyl esters of hydrogenated abietic acid, and air or oxygen blown alkyl esters of abietic acid. Particular, illustrative examples of products of condensation of formaldehyde with a tertiary alcohol or unsaturated organic compounds will be described hereinafter. Particular examples of the abietic acid esters are methyl abietate, $C_{19}H_{29}COOCH_3$, known on the market as "Abalyn," dihydro methyl abietate,

known on the market as "Hercolyn," and methyl abietate which has been blown with air while being stirred at about 70° to 80° C. for from about 16 to about 36 hours. After 16 hours blowing the viscosity is about 100 poises and after 36 hours blowing the viscosity is over 200 poises. The mutual solvent or mutually compatible vehicle can be considered as a material which is adapted to wet one or both of the said essential ingredients to the point where the two said essential ingredients become compatible or dissolved in one another.

The present application is a continuation in part of my copending application Ser. No. 351,964, filed August 9, 1940.

An object of the present invention is to provide a method and material for making a composition with that "artificial rubber" known on the market by such names as "Buna" or "Perbunan" whereby an artificial rubber compound is produced which has certain physical and chemical characteristics which are deficient or entirely lacking in "Buna" itself.

The compositions of the present invention can be used either with or without real rubber therein for various uses to which natural rubber is put and for other uses for which real rubber is not suited.

Various objects and advantages of the present invention will be pointed out and will be apparent from the following description of the products of the present invention and of methods and steps of making and using said products.

The term "Buna" as used herein is intended to mean certain synthetic materials made from butadiene, with or without other materials, by polymerization or copolymerization, to produce artificial rubber materials, for illustrative examples, those known as and sold under the names of "Buna," "Buna S," and "Perbunan" ("Buna N"), "Buna" is a straight butadiene polymer; "Buna S" is a copolymer of butadiene and styrene; and "Perbunan" ("Buna N") is a copolymer of butadiene and acrylonitrile; and the term "Buna" as used herein is intended to cover also other butadiene polymers and copolymers of the "Buna" type including products obtained by various polymerization methods and steps and products obtained by copolymerizing various proportions of materials such as various proportions of styrene and butadiene or of acrylonitrile and butadiene and products obtained by copolymerizing other or different materials with butadiene such as copolymerizing both styrene and acrylonitrile with butadiene and copolymerizing coumarone or indene with butadiene and to cover generally artificial rubbers which are butadiene polymers or copolymers.

The term vinyl polymer is used to designate polymers of vinyl esters such as polymerized vinyl chloride, polymerized vinyl acetate, copolymers of vinyl chloride and vinyl acetate, polymerized vinyl chloroacetate and other polymerized vinyl esters. These range in consistency from the liquid state to solid resin-like products depending on the material and on the degree or extent to which they are polymerized and are used in the practice of the present invention in their various states according to the use to which they are to be applied and to the suitability of their consistency to the method of handling required in putting them to use. For a number of uses such as in getting rubber-like gels with the "mutual solvent," before the "Buna" type rubber is incorporated, vinyl polymers having molecular weights between 20,000 and 30,000 are preferred. "Vinylite-vyn w" has a molecular weight of about 24,000 and "Vinylite qyna" has a molecular weight of from about 20,000 to about 22,000.

The mutual solvent or mutually compatible vehicle for the "Buna" and the vinyl polymer of the present invention is a material which will serve to make the "Buna" and the vinyl polymer compatible with each other and bring them together into a workable composition and at the same time will not act deleteriously when the composition is handled and work into more advanced and final states (as, for example, by vulcanization through heating) but will remain a part of the final composition either in its original form or in some intermediate or final form.

Following are illustrative examples of the methods and composition of the present invention.

Example 1.—A. One hundred parts by weight of methyl abietate are heated to from about 150° to about 165° C. and twenty-five parts of polymerized vinyl chloride, known on the trade as "vinylite qyna," having a molecular weight of from about 20,000 to about 22,000, are added and stirred until solution takes place. This is cooled and ready for various uses. When cooled, this product is a rubbery mass, and is a gel, and can be milled into the "Buna" type artificial rubbers, above identified, to improve aging, tear resistance and other physical properties.

B. To a batch of the product described, in paragraph A, above, one hundred and twenty-five parts of "Buna S" were added and milled together on rubber-mixing rolls, together with nine parts of zinc oxide, five parts of "Aminox," eight parts of "Tuads", and one hundred and ten parts of "Gastex." This produces a "rubber" batch suitable for formation into various shapes which can be vulcanized, for example, at 150° C. for about fifteen minutes in a pressure mold.

Example I.—A. Ten parts by weight of pure gum turpentine, about fifteen parts of a commercial formaldehyde solution (about 37½% in water), and about one part by weight of concentrated sulphuric acid were heated together under a reflux condenser to refluxing temperature for about eight hours from which was obtained about thirteen and one-half parts of a water insoluble liquid reaction product having a specific gravity of 1.03.

B. The water insoluble liquid reaction product of IA, in the previous paragraph, was heated to 230° C. to obtain a loss of 25% by evaporation leaving a residue which is a product slightly more viscous than the liquid reaction product of IA.

C. The water insoluble liquid reaction product of IA, above, was blown with air for from about 16 hours to about 48 hours at from about 70° C. to about 80° C. to obtain viscosities ranging about 150 centipoises upwardly to about 500 centipoises at 25° C. when from four parts by weight thereof are diluted with one part of xylol.

Example II.—A. About sixty-four parts by weight of a commercial solution of formaldehyde in water (about 37.5% solution), twenty-four parts of tertiary amyl alcohol and about two-tenths of one part of concentrated sulphuric acid (specific gravity about 1.8) were placed in an autoclave and heated until a pressure of about one hundred pounds was reached at which point it was kept for about one hour, after which the pressure was released by opening a valve for the purpose of blowing off unreacted reagents and products of reaction which are volatile at this temperature (about 150° C.).

The sulphuric acid, used as a catalyser or condensing agent, was neutralized with sodium hydroxide solution, the reaction mass was heated in an open pan in an oven at about 150° C. to dehydrate it, after which the sodium sulphate was filtered off. The reaction product now remaining is called herein product IIA and comprises, generally, a water soluble fraction which is about two-thirds of product IIA by weight and a water insoluble fraction which is about one-third of product IIA and these two fractions can be separated by fractional distillation at a reduced pressure, for example, at from about 20 to about 30 millimeters of mercury.

B. Product IIA, described above, was chlorinated by blowing anhydrous chlorine gas through it until it had gained five per cent of its own original weight in chlorine combined therewith. This chlorination product is designated herein as product IIB.

Example 2.—In place of the methyl abietate of Example 1 (A and B), above, the same quantity by weight of dihydro methyl abietate can be used.

Example 3.—In place of the methyl abietate of Example 1 (A and B), above the blown methyl abietate, described above, can be used.

In some cases chlorinated alkyl abietate, e. g., chlorinated methyl abietate, can be used in place of the methyl abietate of Example I (A and B).

Example 4.—By weight, ten parts of "Vinylite vyn w" were dissolved in forty parts of product IA, described above, by heating them together at about 150° C., after which were added fifty parts of "Buna S," three and one-half parts of zinc oxide, two parts of "Aminox," three parts of "Tuads," and forty-five parts of "Gastex," these ingredients being mixed on rubber mixing rolls. This composition after mixing can be cured in a mold at about 150° C.

Example 5.—A composition similar to that of Example 4 was made with the difference that product IB was substituted for product IA and in the same quantity by weight. This gave a drier or less tacky "rubber" than the composition of Example 4.

Example 6.—A composition similar to that of Example 4 was made with the difference that product IIA was substituted for product IA and in the same amount by weight.

Example 7.—A composition similar to that of Example 4 was made with the difference that product IIB was substituted for product IA and in similar amount. This gave a drier or less tacky "rubber" than the composition of Example 4.

Example 8.—By weight, eighty parts of "Perbunan," twenty-five parts of "Vinylite-vyn w," fifty parts of either of product IA, IB, IIA or IIB, five parts of zinc oxide, one part of stearic acid, two parts of sulphur, forty-five parts of "P–33," ten parts of "Speedon," one and two-tenths parts of "Altax" and three-tenths part of dibutyl amine are mixed together. This composition can be cured for example for thirty minutes at about 140° C.

General example.—In each of Examples 4 to 7, inclusive, the quantity of "Vinylite-vyn w" can be increased to fifteen parts and of the product IA (IB, IIA and IIB) can be decreased to thirty-five parts.

The following trade-mark names or trade names are identified as follows: "Gastex" and "P–33" are carbon blacks; "Speedon," "Altax" and "Tuads" are vulcanization accelerators; and "Aminox" is an antioxidant.

In the examples above the following can be substituted for all or any part of the "Vinylite-vyn-w" wherever that is used: "Qyna" which is polymerized vinyl chloride; "vyn s" which if a copolymer of ninety parts of vinyl chloride and ten parts of vinyl acetate; "vyl f" which is a copolymer of eighty-seven parts of vinyl chloride and thirteen parts of vinyl acetate; "xyfg" which is a polyvinyl butyral, formed by treating polyvinyl alcohol with butyric aldehyde to give an acetal called polyvinyl butyral which is soluble in butyl alcohol and having a high tensile strength, and "Vinylite-vyn w" and the several other vinylite polymers named above in this paragraph can be substituted for "Vinylite q" of Examples 1 to 3 above.

An advantage of the compositions of the present invention is that they have a greatly improved tear strength or resistance as compared with similar compositions made of "Buna" type artificial rubber without the vinyl polymers.

In addition to illustrating the method of bringing artificial rubber of the "Buna" type into solution or compatibility with vinyl polymers, these examples also illustrate the use of these solutions of "Buna" type artificial rubber with vinyl polymers in "rubber" mixtures or compositions suitable for molding by heat and pressure or suitable for sheeting in calendar or sheeting rolls and for general use to which rubber compositions can be placed.

The "Buna-"polyvinyl resin-mutual solvent compositions of the present invention can be vulcanized with sulphur alone or with various other vulcanizers and can be used generally in the manner of rubber mixes as illustrated above by the examples given.

In the claims the term alkyl ester of abietic acid and of dihydro abietic acid are intended to cover the methyl, ethyl, propyl, butyl and the several isomeric forms of the propyl and butyl esters of abietic acid and of dihydro abietic acid.

According to the present invention butadiene artificial rubbers are made to have characteristics and qualities which they do not have of themselves and this by the addition of comparatively small quantities of polyvinyl resins having high molecular weights, that is of the order of from about 20,000 to about 40,000, the addition being made through the medium of a mutual solvent which is non-volatile up to at least 150° C. A number of the mutual solvents disclosed herein do not have boiling points at normal pressures and cannot be distilled at normal pressures without decomposition.

General examples of compositions of the present invention which illustrate the ratios of polyvinyl ester, butadiene artificial rubber and mutual solvent are as follows:

|  | Parts by weight | | |
| --- | --- | --- | --- |
|  | A | B | C |
| Butadiene artificial rubber | 50 | 75 | 90 |
| Polyvinyl ester | 10 | 5 | 2 |
| Mutual solvent | 40 | 20 | 8 |

Generally the ratio of butadiene artificial rubber to polyvinyl ester can be stated to range from about 50 to 1 to about 2 to 1, and the ratio of mutual solvent to polyvinyl ester to obtain a gel-like product can be stated to range from about 10 to 1 to 1 to 1. For melting the mutual solvent and polyvinyl resin together the range is from about 10 to 1 to about 2.5 to 1, and in the ratios from about 2.5 to 1 to about 1 to 1 the two ingredients can be brought together by milling them into each other on rubber mixing rolls, the products along the whole range (10 to 1 to 1 to 1) being rubber-like gels.

In Examples I to II pine oil can be substituted for the pure gum turpentine or the tertiary amyl alcohol, respectively, and in Example II tertiary butyl, hexyl or octyl alcohol can be substituted for the tertiary amyl alcohol, molecular equivalent amounts being used and the turpentine being calculated as pinene and the pine oil as terpineol (ml. wt. 154).

In the examples above, where methyl abietate is used, the other alkyl esters of abietic acid having from one to four carbon atoms in the alkyl group can be used.

Having thus described my invention, what I claim and desire to protect by Letters Patent is:

1. A millable composition comprising a rubbery polymer of butadiene and a gel comprising (a) normally solid polyvinyl ester selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery polymer by weight to said polyvinyl ester by weight being between about 50 to 1 and 2 to 1.

2. A millable composition comprising a rubbery polymer of butadiene and a gel comprising (a) a normally solid polyvinyl ester having a molecular weight between about 20,000 and 40,000 and selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery polymer by weight to said polyvinyl ester by weight being between about 50 to 1 and 2 to 1.

3. The method which comprises masticating a rubbery polymer of butadiene and a gel comprising (a) a normally solid polyvinyl ester selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery polymer by weight to said polyvinyl ester by weight being between about 50 to 1 and 2 to 1.

4. A millable composition comprising a rubbery copolymer of butadiene and styrene and a gel comprising (a) a normally solid polyvinyl ester selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery copolymer by weight to said polyvinyl ester by weight being between about 50 to 1 and 2 to 1.

5. A millable composition comprising a rubbery copolymer of butadiene and acrylonitrile and a gel comprising (a) a normally solid polyvinyl ester selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery copolymer by weight to said polyvinyl ester by weight being between about 50 to 1 and 2 to 1.

6. The method which comprises masticating a rubbery copolymer of butadiene and styrene and a gel comprising (a) a normally solid polyvinyl ester selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery copolymer by weight to said polyvinyl ester by weight being between about 50 to 1 and 2 to 1.

7. The method which comprises masticating a rubbery copolymer of butadiene and acrylonitrile and a gel comprising (a) a normally solid polyvinyl ester selected from the group consisting of polyvinyl chloride, polyvinyl acetate and copolymers of vinyl chloride and vinyl acetate and (b) a product produced by blowing with oxygen an alkyl ester of abietic acid having from one to four carbon atoms in the alkyl group, the ratio of said rubbery copolymer by weight to said polyvinyl ester by weight being between about 50 to 1 and 2 to 1.

MORTIMER T. HARVEY.